United States Patent [19]
Bawa et al.

[11] Patent Number: 5,295,851
[45] Date of Patent: Mar. 22, 1994

[54] ELECTRICAL CONNECTOR HUB HAVING IMPROVED SEALING RING

[75] Inventors: Jaspal S. Bawa, Memphis, Tenn.; Giacomo Mancini, Piscataway; Luis R. Couto, Hillside, both of N.J.

[73] Assignee: Thomas & Betts Corporation, Bridgewater, N.J.

[21] Appl. No.: 955,945

[22] Filed: Oct. 2, 1992

[51] Int. Cl.⁵ .................................. H01R 13/52
[52] U.S. Cl. .................................. 439/273; 439/271
[58] Field of Search .............. 439/548, 552–559, 439/271–283

[56] References Cited

U.S. PATENT DOCUMENTS

| | | | |
|---|---|---|---|
| 2,986,409 | 5/1961 | Weber | 285/161 |
| 3,104,120 | 9/1963 | Myers | 285/161 |
| 3,384,393 | 5/1968 | Horton et al. | 285/158 |
| 3,448,430 | 6/1969 | Kelly | 339/143 |
| 3,603,912 | 9/1971 | Kelly | 339/89 |
| 3,667,783 | 6/1972 | Sotolongo | 285/161 |
| 3,719,918 | 3/1973 | Kerr | 439/559 |
| 3,744,008 | 7/1973 | Castellani | 339/103 |
| 3,747,960 | 7/1973 | Bawa | 285/39 |
| 3,915,479 | 10/1975 | Sotolongo | 285/158 |
| 3,977,750 | 8/1976 | Glover et al. | 439/556 |
| 4,273,405 | 6/1981 | Law | 339/94 |
| 4,468,535 | 8/1984 | Law | 174/65 |
| 4,588,247 | 5/1986 | Grappe et al. | 439/556 |
| 4,679,827 | 7/1987 | Law | 285/158 |
| 4,857,007 | 8/1989 | Michaels et al. | 439/273 |
| 5,051,541 | 9/1991 | Bawa et al. | 174/65 |
| 5,072,072 | 12/1991 | Bawa et al. | 174/65 |

*Primary Examiner*—David L. Pirlot
*Attorney, Agent, or Firm*—Robert M. Rodrick

[57] ABSTRACT

An electrical connector is secured to a wall of an electrical enclosure. The connector permits passage of electrical cable and conduits into the enclosure. The connector includes a hub having a cable receiving end, a cable egressing end and a central passage therethrough. A hub nut is attachable to the cable egressing end to secure the hub to the enclosure wall. The hub further includes an annular shoulder having a groove therein which accommodates a sealing ring for providing sealed engagement of the hub to the enclosure wall. The sealing ring has a body of noncircular cross-sectional shape having a dimension which is greater than the longitudinal dimension of the groove to provide a seal against the wall of the enclosure upon attachment of the hub. The sealing ring further includes a radially extending skirt for retaining the sealing ring within the groove.

4 Claims, 2 Drawing Sheets

ELECTRICAL CONNECTOR HUB HAVING IMPROVED SEALING RING

FIELD OF INVENTION

The present invention relates to an electrical connector for securement to a wall of an electrical enclosure and more particularly relates to an electrical connector hub having a sealing ring which provides an improved seal between the hub and the wall of the enclosure.

BACKGROUND OF THE INVENTION

In order to run electrical conduit or cable into an electrical enclosure such as a junction box, a connector, commonly known as a hub, is typically employed. The hub is positionable in an opening in a wall of the electrical enclosure and is secured to the enclosure by use of a nut attached to the hub from the inside of the enclosure. The hub provides a passage to permit electrical wire or conduit to be pulled therethrough and into the electrical enclosure.

In order to provide a weatherproof seal between the hub and the wall of the enclosure, the hub typically includes a sealing ring which is supported by the hub against the wall of the enclosure.

A typical sealing ring, known in the art, is of the O-ring of variety, that is, a ring having a circular cross-sectional shape. While rings of this type perform adequately for their intended function, it has been found that O-rings have a tendency not to remain captive within the hub. They may become damaged upon installation or inadvertently lost. Also, for the O-ring to seal properly, it is necessary that the hub be placed in the opening through the enclosure precisely perpendicular to the plane of the wall. Any skewing of the hub with respect to the wall of the enclosure, may result in an inadequate seal between the hub and the enclosure itself.

It is desirable to provide a sealing ring which is captively retained by a hub and which will provide a sealed connection between the hub and the wall of the enclosure even where the hub is not precisely positioned perpendicular with respect to the wall of the enclosure.

SUMMARY OF THE INVENTION

It is therefore an object of the present invention to provide an electrical connector hub for securement to the wall of an electrical enclosure which permits the passage of electrical conduit and cable into the enclosure.

It is a further object of the present invention to provide an electrical connector hub which seals against the wall of the electrical enclosure.

It is a still further object of the present invention to provide an electrical connector hub having an improved sealing ring which is captively retained by the hub and which provides a seal between the hub and the wall of the enclosure.

In the efficient attainment of these and other objects, the present invention provides an electrical connector for securement to a wall of an electrical enclosure. The connector includes a hub having a cable receiving end, an opposed cable egressing end and an internal bore therebetween. A hub nut is attached to the cable egressing end of the hub to secure the hub to the wall of the enclosure. The hub further includes an annular shoulder extending between the cable receiving end and the cable egressing end for abutment against the wall of the enclosure upon attachment of the hub nut to the hub. The shoulder includes an annular grove therein having given transverse and longitudinal dimensions. A sealing ring is positioned within the groove for sealing engagement with the wall. The sealing ring has a body of non-circular cross-sectional shape having a longitudinal dimension which is greater than the longitudinal dimension of the groove and a transverse dimension which is less than the transverse dimension of the groove. The sealing ring further includes a radially inwardly extending skirt. The skirt has a transverse dimension such that the transverse dimension of the body and the skirt together exceeds the transverse dimension of the groove. This relationship captively supports the sealing ring in the groove in proper alignment.

DETAILED DESCRIPTION OF THE PREFERRED EMBODIMENT

Figure 1:
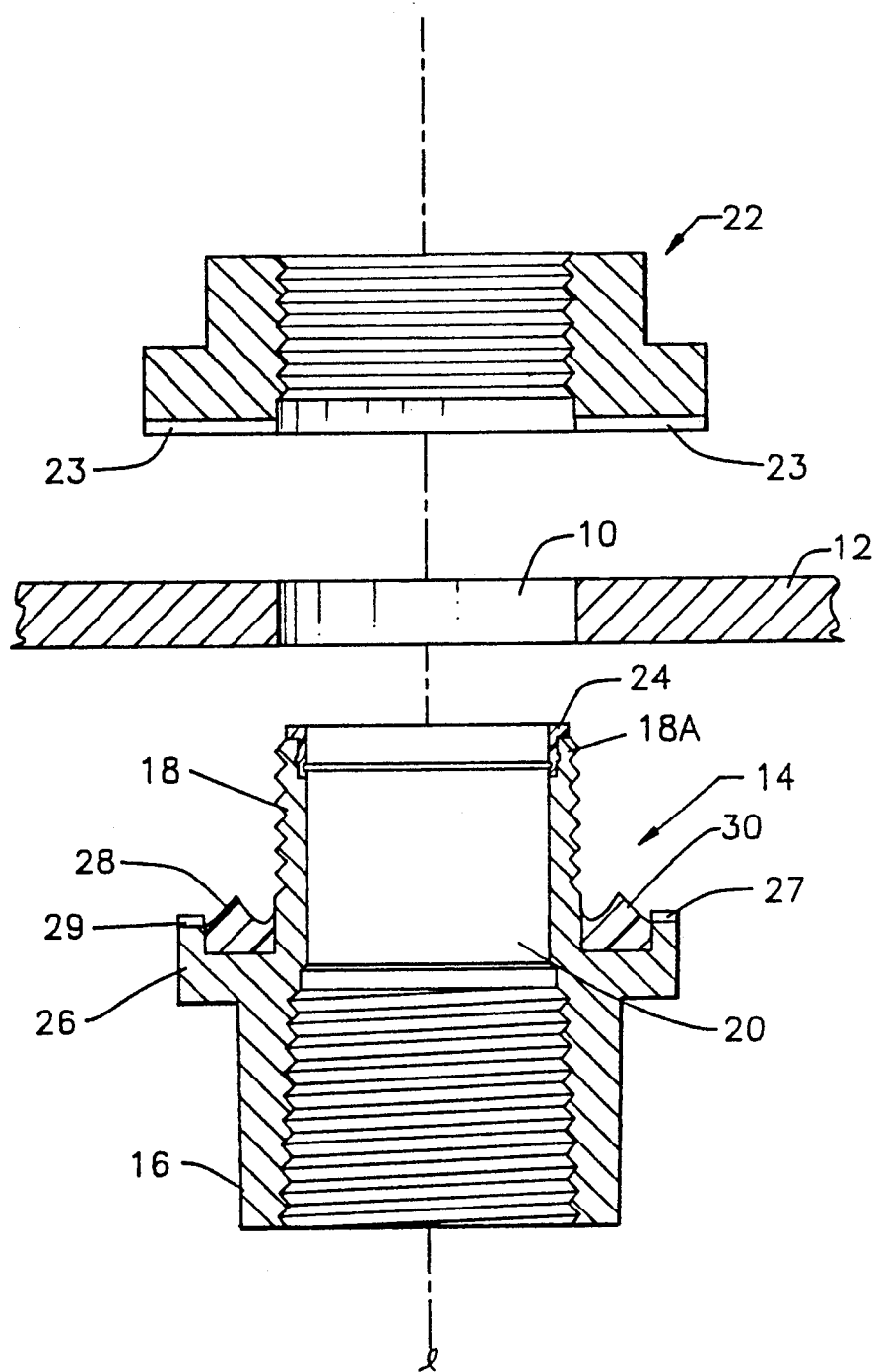
FIG. 1 is an exploded sectional view of the hub connector of the present invention attachable to a wall of an electrical enclosure.

In use, an electrical panel box or junction box typically has an opening 10 through a panel wall 12 to permit the ingress and egress of electrical conduit or cable (not shown). In order to facilitate passage of such conduit or cable through opening 10, a connector hub 14 is employed. Connector hub 14 is an elongate hollow, generally cylindrical member typically formed of conductive metal, having a cable receiving end 16 and an opposed cable egressing end 18. Hub 14 includes a hollow cylindrical internal bore 20 between ends 16 and 18 permitting passage of cable or conduit therethrough. Cable egressing end 18 of hub 14 is dimensioned to be inserted through opening 10 of panel wall 12. Egressing end 18 is externally screw threaded so as to accommodate a metallic hub nut 22, which is internally screw threaded, to secure connector hub 14 against wall 12. The hub 14 and the hub nut 22 are disposed on opposite sides of wall 12. Hub nut 22 may include gripping fingers 23 so that adequate electrical engagement is maintained between hub nut 22 and metallic panel wall 12.

The cable receiving end 16 of connector hub 14 may be internally screw threaded to permit attachment of other connection devices (not shown) which facilitate securement of cables or conduit to connector hub 14.

A distal extent 18a of egressing end 18 of connector hub 14 includes a protective throat 24, typically formed of plastic, which protects the cable or conduit exiting the egressing end 18. Protective throat 24 may be snap-fitted over the distal extent 18a of egressing end 18 preventing contact between the cable or conduit pulled therethrough and the sharp metallic edges of the connector hub 14.

Connector hub 14 further includes a radially outwardly extending annular shoulder 26 located midway between cable receiving end 16 and egressing end 18. An edge 27 of shoulder 26 facing egressing end 18 includes gripping fingers 29 extending toward wall 12 as shown in FIG. 1. As with fingers 23 of hub nut 22, fingers 29 grip panel wall 12 providing electrical engagement between wall 12 and hub 14.

Figure 2:
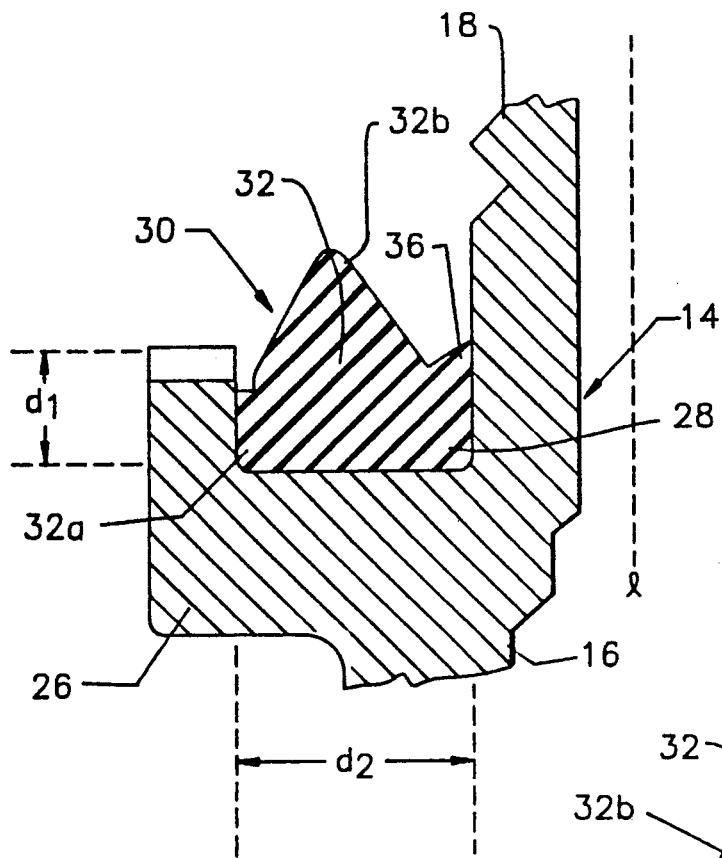
FIG. 2 is an enlarged sectional showing of an improved sealing ring of the present invention supported by the hub shown in FIG. 1.

Referring additionally to FIG. 2, shoulder 26 is shown in further detail. Shoulder 26 includes an open-ended annular groove 28 which opens toward egressing end 18. Groove 28 has generally a rectangular cross-sectional shape having a dimension $d_1$ along the central longitudinal axis $\lambda$ of connector hub 14 and a dimension $d_2$ transverse to the central longitudinal axis $\lambda$. Groove 28 is designed to captively support sealing ring 30 shown in further detail in FIG. 3.

Figure 4:
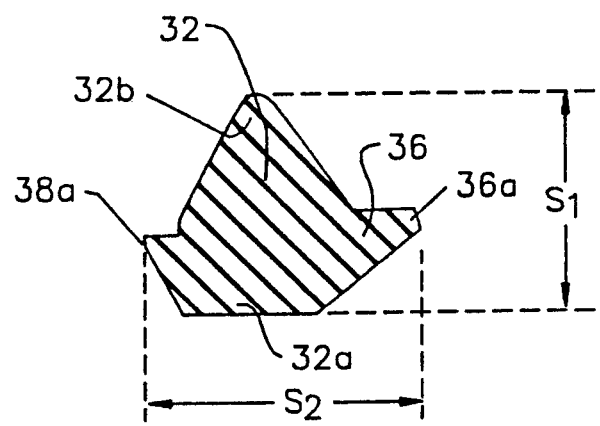
FIG. 4 shows in section the sealing ring of FIG. 3 taken through the lines III—III thereof.
Figure 3:
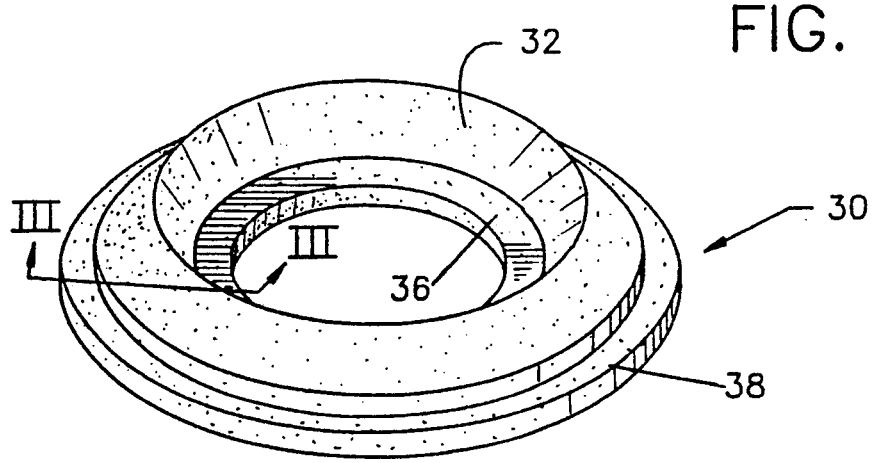
FIG. 3 is a perspective showing of the sealing ring of FIG. 2.

Sealing ring 30 has a body 32 of non-circular cross-sectional shape. As shown in FIGS. 2 through 4, body 32 has a wider lower end portion 32a diverging outwardly toward cable receiving end 16 of connector hub 14. Body 32 also has a converging upper end portion 32b extending toward egressing end 18 of connector hub 14. The wider lower end portion 32a of body 32 allows the ring 30 to seat properly in groove 28. The narrow upper end portion 32b permits the ring 30 to seal against wall 12. As shown in FIG. 4, body 32 has a longitudinal extent of $S_1$ which is greater than $d_1$ the longitudinal extent of groove 28. Thus as is clearly shown in FIG. 2, in position within groove 28, upper end portion 32b of body 32 extends outwardly of groove 28. As stated above, the shape and extent of upper end portion 32b permits an adequate seal to be maintained between connector hub 14 and wall 12 even in situations where connector hub 14 is not positioned precisely perpendicular with respect to wall 12.

In order to captively retain sealing ring 30 within groove 28 and also to maintain the relative position of the non-circular body 32 within groove 28, sealing ring 30 includes oppositely extending transversely disposed deflectable skirt members 36 and 38. As shown in FIGS. 2 through 4, body 32 includes an inwardly extending annular skirt 36 which has a inwardly tapering distal extent 36a which permits deflection of skirt 36 upon insertion of the sealing ring 30 into groove 28. Skirt 36 defines an acute angle with respect to upper portion 32b of body 32. This also facilitates insertion of sealing ring 30 into groove 28. This angle permits the sealing ring 30 to be inserted into groove 28 without causing sealing ring 30 to roll or otherwise become distorted or repositioned. Body 32 also includes an oppositely directed outwardly extending skirt 38 which is also deflectable upon insertion of sealing ring 30 into groove 28. The dimension and position of skirts 36 and 38 permit the sealing ring 30 to be captively retained within groove 28. As shown in FIG. 4, the transverse dimension of sealing ring 30 as measured from the distal extent 38a of skirt 38 to the distal extent 36a of skirt 36, $S_2$ is greater than the transverse dimension $d_2$ of groove 28. Thus, upon insertion of sealing ring 30 into groove 28, either or both of skirts 36 and 38 will deflect to provide frictional securement of sealing ring 30 within groove 28. Also, the position of skirts 36 and 38 help support the ring 30 in proper orientation within groove 28 preventing the ring from twisting which could result in an ineffective seal against wall 12.

Various changes to the foregoing described and shown structures would now be evident to those skilled in the art. Accordingly, the particularly disclosed scope of the invention is set forth in the following claims.

We claim:

1. An electrical connector for securement to a wall of an electrical enclosure comprising:
   a hub having a cable receiving end, a cable egressing end and an internal bore therebetween, said cable egressing end being dimensioned for passage through an opening in said wall;
   a hub nut for attachment to said cable egressing end of said hub for securing said hub to said wall;
   said hub further including an annular shoulder extending transversely between said cable receiving end and said cable egressing end of hub for abutment against said wall upon attachment of said hub nut to said hub, said shoulder having an annular groove therein, said groove having a given transverse and longitudinal dimension; and
   a sealing ring positioned in said groove for sealing engagement with said wall, said sealing ring having body of noncircular cross-sectional shape having a first dimension which is greater than the longitudinal dimension of said groove and a second dimension within said groove which is less than the transverse dimension of said groove, said sealing ring further including radially inwardly extending skirt positioned within said groove said skirt having a transverse dimension such that the transverse dimension of said body and said skirt exceeds said transverse dimension of said groove.

2. A connector of claim 1 wherein said non-circular body has an inwardly converging longitudinal end extent.

3. A connector of claim 2 wherein said non-circular body has an outwardly diverging longitudinal end extent.

4. A connector of claim 3 wherein said inwardly converging longitudinal end extent and said outwardly diverging longitudinal end extent of said body are longitudinally opposed.

* * * * *